United States Patent [19]
Alfrey, Jr.

[11] 3,844,739
[45] Oct. 29, 1974

[54] APPARATUS AND METHOD FOR THE PREVENTION OF EVAPORATIVE LOSS OF MIXED ORGANIC LIQUIDS

[75] Inventor: Turner Alfrey, Jr., Midland, Mich.

[73] Assignee: The Dow Chemical Company, Midland, Mich.

[22] Filed: Oct. 5, 1972

[21] Appl. No.: 295,286

[52] U.S. Cl. .................................. 55/74, 55/316
[51] Int. Cl. ........................................ B01d 53/04
[58] Field of Search .................... 55/74, 316, 387

[56] References Cited
UNITED STATES PATENTS

| | | | |
|---|---|---|---|
| 2,992,703 | 7/1961 | Vasan et al. | 55/70 |
| 3,368,326 | 2/1968 | Hervert | 55/316 |
| 3,460,522 | 8/1969 | Kittler et al. | 55/316 |
| 3,727,379 | 4/1973 | Bijleveld et al. | 55/74 |

Primary Examiner—Charles N. Hart
Attorney, Agent, or Firm—Robert B. Ingraham

[57] ABSTRACT

Evaporative loss of mixed organic liquids from vented containers is prevented by employing a dual sorption system wherein the vapors first contact a sorbent for the high boiling fraction and subsequently a sorbent for the low boiling fraction. The sorbents are readily regenerated by the passage of a gas such as air therethrough.

9 Claims, 1 Drawing Figure

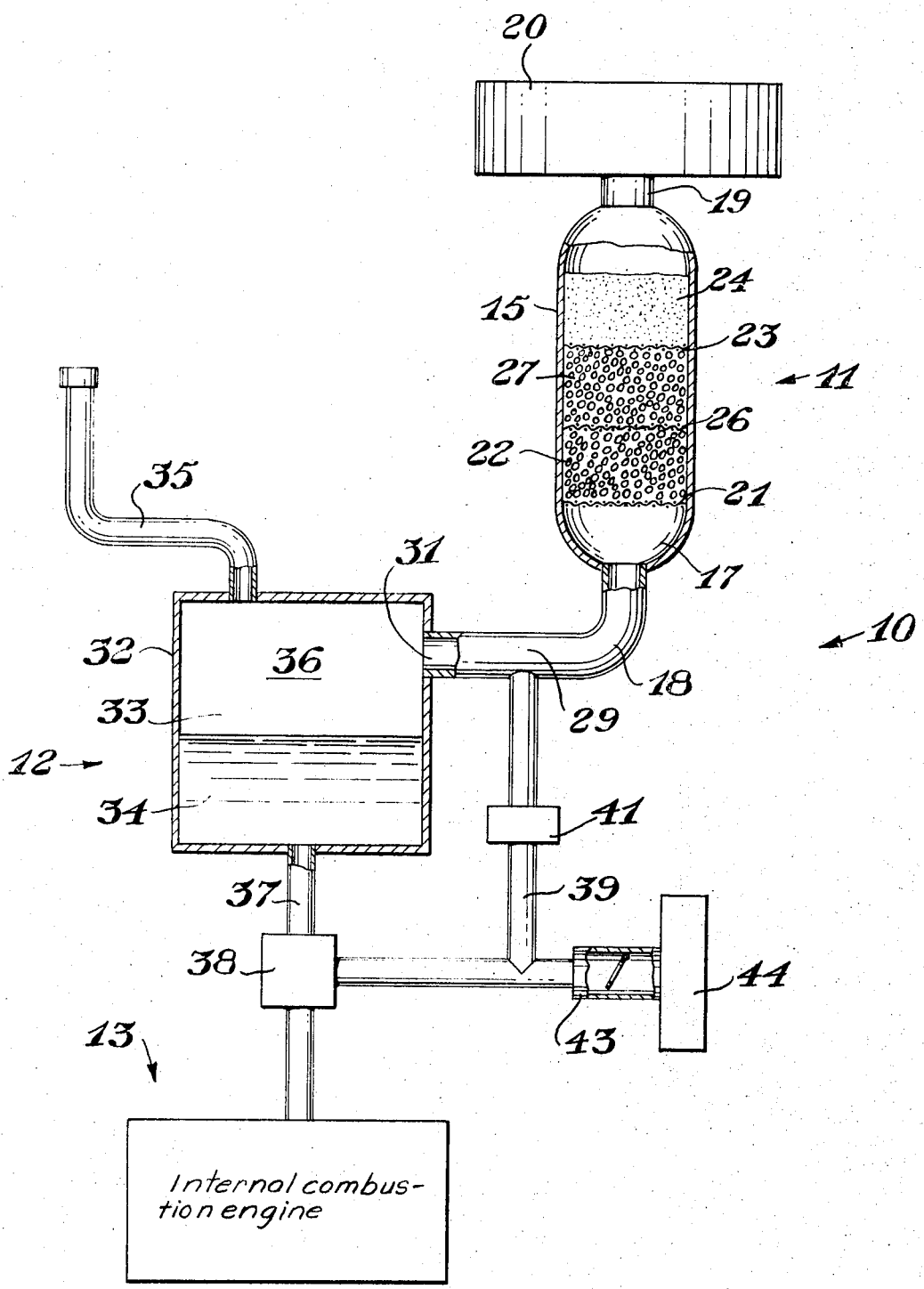

APPARATUS AND METHOD FOR THE PREVENTION OF EVAPORATIVE LOSS OF MIXED ORGANIC LIQUIDS

In the storage and utilization of mixed volatile organic liquids, considerable difficulty has been encountered in reducing evaporative loss from vented vessels. For example, in the handling of gasoline for internal combustion engines, it is necessary that the storage tank and carburetor be vented. Various efforts have been made to reduce the evaporative losses from tanks, carburetors and the like employing a vapor sorbing bed which hopefully would be regenerated by the flow of gas such as air therethrough, on operation of the engine and/or emptying of the storage vessel. Generally when utilizing mixed organic liquids which have a wide range of boiling points, a given sorbent may work very satisfactorily for the higher boiling constituent. However, due to the presence of a lower boiling constituent in the vapor phase, the sorbent, which is sufficiently active to absorb the vapors of the lower boiling constituents, is generally poisoned or contaminated by the higher boiling constituents. Thus, regeneration of the sorbent by a simple technique, such as passing air therethrough, is relatively ineffective and the sorbent, over a period of time, is markedly reduced in effectiveness, and for practical purposes can be considered "poisoned".

It would be desirable to have available an improved vapor emission control system for mixed organic liquids.

It would also be desirable to have available an improved vapor emission control device for mixed organic liquids.

It would further be desirable to have available an improved method and device for vapor emission control of mixed hydrocarbon liquids such as gasoline.

These benefits and other advantages in accordance with the present invention are achieved in a method for controlling the vapor emission of a vented container of mixed organic liquids, the steps of the method comprising providing a container adapted to receive mixed volatile organic liquids, the container having a vent, the vent providing communication between the interior of the container and a surrounding gaseous atmosphere, the improvement which comprises interposing between the interior of the container and a terminal open end of the vent a composite sorbing bed, the sorbing bed having at least a first sorbent capable of sorbing and desorbing the highest boiling fraction of the vapor to which it is subjected, said first sorbent being disposed generally adjacent the container, at least a second sorbent capable of sorbing and desorbing the lower boiling component of the liquid mixture, said second sorbent being disposed generally adjacent the terminal portion of the vent remote from the container wherein vapors passing from the container first pass through a first sorbent which sorbs the higher boiling components, and subsequently through a second sorbent which sorbs the lower boiling components, and on passage of gas in the reverse direction the atmosphere desorbs the respective components from the first and second beds.

Also contemplated within the scope of the present invention is a vapor emission control device comprising a housing, the housing defining an internal passageway, the passageway having a container end and a vent end, disposed within the passageway a first sorbent comprising a foraminous bed of an organic synthetic resinous polymer, and a second sorbent disposed generally adjacent the vent end, the second sorbent being more sorptive than the first sorbent in sorbing low boiling organic vapors.

Further features and advantages of the present invention will become more apparent from the following specification taken in connection with the drawing wherein:

The FIGURE schematically depicts an emission control device in accordance with the invention.

In the FIGURE there is depicted a schematic representation of an assembly generally designated by the reference numeral 10. The assembly 10 comprises in cooperative combination an emission control device 11 in accordance with the present invention and a volatile organic liquid storage means 12 in operative combination with an internal combustion engine 13. The control device 11 comprises in cooperative combination a housing 15. The housing 15 defines an internal passageway 17 having a first or container end 18 and a second or vent end 19. The vent end 19 is in operative communication with a gas or air filter 20 which permits free passage of gas from space external to the housing 15 to the passageway 17 and precludes the passage of particulate matter into the passageway 17. Disposed within the passageway 17 is a first support means 21. The first support means 21 has disposed thereon a first foraminous sorbent bed 22 disposed generally adjacent the container end 18 of the passage 17. A second support means 23 is disposed generally adjacent the vent end 19 and has supported thereon a second foraminous sorbent bed 24. A third support means 26 is disposed between the support means 21 and 23 and carries thereon a third foraminous sorbent bed 27. The supports 21, 23 and 26 and the beds 22, 24 and 27 are all foraminous in structure, permitting free passage of gas from the vent end 19 to the container end 18 of the passageway 17 and also in the opposite direction. The sorbent beds 22, 24 and 27 have varying propensity to sorb vapors of the desired liquid. The sorbing characteristics of the beds for the vapors are least for the first bed 22, greatest for the second bed 24 and the third bed 27 is of an intermediate sorbency. In operative communication with the container end 18 of the device 11 is a manifold 29 which provides full communication with space interior to the storage tank 12 by means of the passageway 31 passing through a storage container housing 32. The storage container housing 32 has an interior space 33 partially filled with a mixed organic liquid 34. The mixed organic liquid 34 consists of volatile materials of different boiling points. The container 32 has a closed filler conduit 35 through which additional liquid may be added to an internal space or cavity 36. The container 34 has a discharge conduit 37 in operative combination with a carburetor 38 of the internal combustion engine 13. A conduit 39 has disposed therein a flame arrester 41 and the conduit 39 connects the manifold 29 to the carburetor 38 and serves as a secondary source of combustion air for the internal combustion engine 13. In communication with the carburetor 38 is a check valve 39 which in turn is connected to a primary air filter 44 and serves as a primary source of carburetor air. Without air demand by the engine, the valve is closed.

Operation of the assembly 10 for purposes of illustration can be considered as the operation of a conventional reciprocating internal combustion engine employing gasoline as the fuel. A mixed volatile organic liquid disposed within the cavity 36 of the container 34 emits vapor when the engine 13 is inactive. The vapor from the space 36 passes through the manifold 29 and into the passageway 17 together with evaporative losses from the carburetor 38 passing through the conduit 39 and into the first bed 22. The first bed 22 sorbs principally the higher boiling components from the gasoline vapors. The lower boiling components not sorbed by the bed 22 pass through the foraminous support into the third bed 27 which has a higher propensity to sorb gasoline vapor components where a further fraction is removed from the vapor. The remaining vapor passes through the foraminous support 23 into the second bed 24 where the lower boiling components are sorbed. On activation or starting of the engine 13, air is drawn through the filter 20 into the vent end 19, through the second, third and first beds, respectively, discharged from the container end 18 through the flame arrester 41 in the conduit 39 and into the carburetor 38. The passage of the combustion air through the control device 11 serves to desorb the gasoline or fuel components contained in the beds 22, 24 and 27 and thus regenerate the device and permit a similar sorption cycle to reoccur when the internal combustion engine is no longer running.

In the preparation of devices in accordance with the present invention, the size, volume, porosity and the like must be commensurate with the particular source of vapor with which the device is to be used. For example, a device for a small inboard motorboat employing gasoline as fuel is beneficially much smaller than a corresponding device for a 1,000 horsepower engine.

Although the method and device of the present invention are applicable to a wide variety of mixed organic vapors, further description will be made in terms of a gasoline absorbing device. Such principles are readily applied to other mixed liquid organic systems.

For applications utilizing gasoline, a particularly desirable poor absorbent or material suitable for a first bed, such as the bed 22, is prepared utilizing a copolymer of styrene and divinylbenzene in a porous form. The preparation of such porous polymers is described in great detail in U.S. Pat. No. 3,322,695 and its Reissue Pat. No. Re. 27,026, the teachings of which are herewith incorporated by reference. Particularly beneficial polymers for use with gasoline are those containing from about 17 to 75 weight percent divinylbenzene, the remainder being styrene. Beneficially, from about 20 to 35 weight percent divinylbenzene is employed. Preferably the polymers have a void volume of from about 50 to 100 percent of the volume of the polymer. Generally copolymers containing less than about 25 percent divinylbenzene have a considerable tendency to swell in the presence of hydrocarbon liquids. Such swelling generally is undesirable for most applications as compaction or reduction of porosity of the bed can result unless the polymer is suitably supported. As the amount of divinylbenzene or cross-linking agent is increased the polymer particles become more resistant to swelling and therefore more dimensionally stable in the presence of hydrocarbon vapors. At the higher divinylbenzene levels, increased dimensional stability is obtained. For economic reasons it is usually undesirable to employ levels of divinylbenzene greater than about 50 weight percent. Eminently satisfactory particles are obtained when polymers are prepared in the presence of from about 50 to about 100 percent solvent, based on the total weight of the monomer, suitable solvents being chosen in accordance with the teaching of U.S. Reissue Pat. No. Re. 27,026. Beneficially for gasoline absorption using a polymer of styrene and divinylbenzene, a solvent mixture of about 70 parts of octane to 10 parts ethylenetetrachloride or perchlorethylene is desirable. It is critical and essential to the practice of the present invention that the polymer particles be of a porous nature as described in U.S. reissue Pat. No. Re. 27,026. In the event that such polymer particles are clear and glassy the device does not function.

For purposes of further illustration, porous polymer beads are prepared by the polymerization of styrene with divinylbenzene in a suspension polymerization system generally as described in U.S. Pat. No. 3,322,695. The following materials are employed for the polymerization and the numbers following the material indicate parts by weight unless otherwise noted: water — 1,260; sodium dichromate — 1.17; styrene — 230; a mixture containing 55 weight percent divinylbenzene, 45 weight percent diethylbenzene — 205; perchlorethylene — 50.5; petroleum ether — 255; benzoyl peroxide — 3. Water and sodium dichromate are mixed and deoxygenated by vacuum. The oil phase is mixed with the exception that the benzoyl peroxide is added last. The monomer mixture is added to the water and polymerized with agitation for a period of about 8 hours with the temperature rising from about 60° to 90°C. The polymer is recovered by filtering, water washing and air drying. A composite bed is prepared by forming a first layer of polymer beads and a second layer of activated carbon, each of the beds being supported on and separated from each other by glass wool. The filter bed is weighed and nitrogen gas bubbled through gasoline. The resultant gasoline vapor-saturated nitrogen is passed through the bed, first through the porous beads and then through the activated carbon. The bed is again weighed and nitrogen passed through the bed, first through the carbon and then through the porous beads. Periodically the bed is weighed to determine the percentage loss in weight of the absorbed materials. After about 1,600 minutes, 86.6 percent of the gasoline vapors are desorbed. For purposes of comparison, only activated carbon shows a loss of 27.9 percent of sorbed material after 1,100 minutes; only about 28 weight percent of the sorbed material is desorbed. Gasoline-saturated nitrogen is again passed through the activated charcoal/porous bead bed, the nitrogen being first passed through the porous beads and then through the charcoal. Gasoline is desorbed by passing nitrogen therethrough in the reverse direction at a rate of 50 cubic centimeters per minute and after a period of about 3,000 minutes more than 99 percent of the material sorbed in the second treatment is removed from the bed. The charcoal bed is again treated with gasoline-saturated nitrogen vapor and the gasoline vapor desorbed in a similar manner. After 1,200 minutes, about 57 percent of the gasoline taken up in the second treatment is desorbed.

In a manner similar to the foregoing illustration, dual component sorption beds; that is, using a layer of absorbent such as charcoal and porous plastic beads, sorb and desorb hydrocarbon vapors readily and provide an effective means of preventing atmospheric contamination especially when employed with an internal combustion engine.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for controlling the vapor emission of a vented container of mixed organic liquids, the steps of the method comprising providing a container adapted to receive mixed volatile organic liquids, the container having a vent, the vent providing communication between the interior of the container and a surrounding gaseous atmosphere, the improvement which comprises interposing between the interior of the container and a terminal open end of the vent a composite sorbing bed, the sorbing bed having at least a first sorbent capable of sorbing and desorbing the highest boiling fraction of the vapor to which it is subjected, said first sorbent being disposed generally adjacent the container, at least a second sorbent capable of sorbing and desorbing the lower boiling component of the liquid mixture, said second sorbent being disposed generally adjacent the terminal portion of the vent remote from the container wherein vapors passing from the container first pass through a first sorbent which sorbs the higher boiling components, and subsequently through a second sorbent which sorbs the lower boiling components, and on passage of gas in the reverse direction the atmosphere desorbs the respective components from the first and second beds.

2. The method of claim 1 wherein the first sorbent is a polymer of styrene and divinylbenzene.

3. The method of claim 1 wherein the second sorbent is carbon black.

4. The method of claim 1 wherein the vented container is in operative combination with an internal combustion engine.

5. The method of claim 1 including a third sorbent bed of intermediate sorbency disposed between the first and second beds.

6. A vapor emission control device comprising
a housing, the housing defining
an internal passageway, the passageway having
a container end and
a vent end, disposed within the passageway
a first sorbent comprising
a foraminous bed of an organic synthetic resinous polymer, and
a second sorbent disposed generally adjacent the vent end, the second sorbent being more sorptive than the first sorbent in sorbing low boiling organic vapors
a vent in operative communication with the vent end a container in operative communication with the container end the container having dispersed therein mixed organic liquids.

7. The device of claim 6 wherein the synthetic resinous polymer is a styrene/divinylbenzene copolymer.

8. The device of claim 6 wherein the second sorbent is particulate carbon.

9. The device of claim 6 in operative combination with an internal combustion engine.

* * * * *